United States Patent [19]

Bleuel et al.

[11] 4,434,962
[45] Mar. 6, 1984

[54] FLANGE HAVING AN OUTER AND AN INNER CIRCUMFERENTIAL SEALING FACE AND APPARATUS, COMPRISING SUCH FLANGE, FOR PRODUCING ENVELOPING CASTS ABOUT ELONGATED BODIES

[75] Inventors: Felix Bleuel, Basel; Christian Bosshard, Frenkendorf, both of Switzerland

[73] Assignee: Ciba-Geigy Corporation, Ardsley, N.Y.

[21] Appl. No.: 350,838

[22] Filed: Feb. 22, 1982

[30] Foreign Application Priority Data

Feb. 27, 1981 [CH] Switzerland .......................... 1334/81
Jan. 5, 1982 [CH] Switzerland ............................. 26/82

[51] Int. Cl.³ .......................... B29C 1/00; B29D 3/00
[52] U.S. Cl. ..................................... 249/65; 138/109; 249/187 R; 277/34.3; 277/34.6; 425/110
[58] Field of Search ............. 249/187 R, 65; 138/109; 425/417, DIG. 14, DIG. 112, 110; 258/97, 294, 297; 277/34, 34.3, 34.6

[56] References Cited

U.S. PATENT DOCUMENTS

| | | | |
|---|---|---|---|
| 2,660,458 | 11/1953 | Collins et al. | 285/97 |
| 2,816,575 | 12/1957 | Stokes | 285/97 |
| 2,816,780 | 12/1957 | Ross | 285/97 |
| 3,038,732 | 6/1962 | Scott et al. | 277/34.3 |
| 3,572,769 | 3/1971 | Lingl | 285/96 |
| 4,167,430 | 9/1979 | Arachi | 264/337 |
| 4,226,444 | 10/1980 | Bunyan | 285/294 |

*Primary Examiner*—Willard E. Hoag
*Attorney, Agent, or Firm*—Harry Falber

[57] ABSTRACT

Two flanges form together with an outer tube a sealed-off casting mold for applying an envelope to a pipe at least part of which is lodged in the mold. The lower flange is equipped with a feed-in duct system and the upper flange with an air-escape and overflow duct. The flanges consist of a material of rubber-like elasticity.

The duct system of the lower flange comprises a radially extending bore which opens in an annular distributory channel which merges with aerodynamic contours with a flow gap. The flow gap is of such configuration that it is closed when, and as long as, a higher pressure is exerted on the forward frontal face of the lower flange than prevails in the annular channel.

The flanges are so shaped in the regions of their sealing faces that the contact pressure exerted on them increases proportionally with the pressure exerted on one of the frontal faces.

14 Claims, 3 Drawing Figures

FLANGE HAVING AN OUTER AND AN INNER CIRCUMFERENTIAL SEALING FACE AND APPARATUS, COMPRISING SUCH FLANGE, FOR PRODUCING ENVELOPING CASTS ABOUT ELONGATED BODIES

BACKGROUND OF THE INVENTION

This invention relates to a flange, made from material of rubber-like elasticity, having an outer and an inner peripheral sealing surface, as well as an apparatus for producing enveloping casts about elongated bodies, wherein the body to be enveloped is positioned coaxially in a tube which together with two terminal closures, forms an annular chamber about the body, into which a liquified casting mass is introduced via one of the two terminal closures.

Flanges having external and internal sealing surfaces are mostly employed as terminal closing means for molds used to produce enveloping casts about elongated bodies, and particularly about pipes.

For this purpose, the pipe to be enveloped by a cast is arranged concentrically within a pipe of larger diameter, and the annular space thus provided between the pipes is hermetically closed by a flange, at least at one of its ends. The mass of casting substance is introduced into the mold either via inlet openings in the peripheral wall of the external pipe, or via axial bores in the flange. The first-named kind of introduction, which will be designated as the radial one hereinafter, has been employed, for instance, in the devices known from the U.S. Pat. Nos. 2,730,769; 2,177,221; 2,129,680 and 3,307,590. The second kind, which shall be designated hereinafter as the axial one, has been embodied in a device known from U.S. Pat. No. 3,941,531.

The radial introduction of the casting mass leads, naturally, to strong turbulences and occlusions of air. It is therefore unsuited for the processing of the more highly reactive casting resin masses, in particular foamable synthetic resin masses. (When processing thermoplastic casting masses, occlusions of air are not such a problem because occluded hollow spaces can be eliminated by re-melting the surrounding portion of the cast mass.)

In accordance with U.S. Pat. No. 3,941,531, an axial introduction of the casting mass is carried out via several bores or tubulures arranged concentrically in a circle. This, however, does not afford a sufficient freedom from turbulence. Therefore, this arrangement cannot be used either in processing masses of the more highly reactive casting resins, especially of foamed plastics except within relatively narrow limits. A further drawback of the device of U.S. Pat. No. 3,941,531 is seen in the relatively long pipe conduits which can be cleaned only with difficulty or not at all.

OBJECTS AND SUMMARY OF THE INVENTION

It is therefore a primary object of the invention to provide a flange of the initially described type equipped with a duct system through which liquid masses, in particular of foamable resin, can be passed in such a manner that at the outlet of the duct system there is generated a largely laminar flow of the casting mass.

This object and others which will become apparent in the further description of the invention is attained in accordance with the invention by the flange comprising a system of ducts which, when the flange is mounted between two concentrically disposed pipes, is adapted to establish communication between the spaces situated on the two different sides of the sealing faces and wherein the duct system opens out via an annular distributory channel and a flow gap connected therewith, in the forward frontal surface of the flange.

By the forward frontal surface of the flange there is meant that surface of the flange which is facing in the direction of flow of casting mass therethrough, e.g. toward the flange closing off the other end of the hollow space between the two concentric pipes.

Specific embodiments of the flange means according to the invention can have one or several of the following inventive features (when the flange according to the invention embodies one or several of the advantageous features described in the foregoing, it affords, among others, the specifically mentioned advantages):

The flange material having an elasticity similar to that of rubber can be of a type which is easily separable from foamed plastics used as enveloping substance, which has solidified on a surface of the flange. The surface of the rubber-elastic flange material can be resistent to adhesives; for instance, it can be a silicone caoutchouc.

Preferably, the flange of the invention is an annular flange having a central passage of a width which permits the pipe to be lodged therein with a firm seat; the gap through which the still liquid enveloping substance is to flow during filling of the mold, can be constituted by a widening of that central passage, of enlarged diameter, in the range between an inner sealing face and the forward frontal face of the flange. This embodiment is particularly simple to clean.

The flange can be of such configuration that the gap is closed due to the shape of at least one of the flange wall zones which surround it as well as due to the elasticity of the flange material, and that it will be opened only when, and as long as, the pressure of a pressure medium which is introduced via the annular distributory channel exceeds the counter-pressure of a medium acting upon the above-mentioned forward frontal flange surface.

Moreover, the configuration of the flange can be such that the flow gap is closed because of the shape of at least one of the flange wall zones delimiting it as well as due to the elasticity of the flange material, when, and as long as, the pressure of a pressure medium acting on the aforesaid forward frontal flange face exceeds by a determined value the pressure of a pressure medium which is introduced via the above-mentioned annular distributory channel. Flanges embodying the last two features described hereinbefore act automatically as a kind of check valve.

According to another advantageous feature, the flange according to the invention can consist of two pieces, and the flow gap, and preferably also the annular distributory channel are constituted by correspondingly shaped recesses in the faces of the two pieces along the plane of separation. It is particularly easy to clean this embodiment of the flange.

At least one wall of the flow gap can be reinforced by backing it, over a limited region of the length of the flowpath through the gap which region is preferably immediately adjacent the annular distributory channel, with a stiff inlay, preferably a metal ring; there can act upon this inlay the forward, free ends of squeezing or pressure screws whose heads are accessible from the outside and which are screwed through internally threaded bores which are cut in a part, of hard material, in particular of metal, embedded in the material of the flange. This embodiment affords particularly exact control of the flow of enveloping substance therethrough.

The part of the flow gap whose wall is backed by a stiff inlay, preferably substantially in a radial plane; and the pressure screws are arranged parallel to the central pipe axis and are accessible from the rearward side of the flange.

In the region of its sealing faces, the flange is preferably of such shape that due to the latter and due to the elasticity of the flange material, the sealing pressure on the sealing faces increases proportionally with a pressure which is exerted by a pressure medium on the forward frontal flange face. This provides a particularly satisfactory sealing effect of the flange. It is of particular advantage that, in this embodiment, the sealing effect increases proportionally with the internal pressure.

The forward frontal face of the flange is advantageously provided with a coaxial recess or groove whose substantially U- or V-shaped cross section extends to the vicinity of the two edges, the inner and the outer one, of the said flange face, while the sealing surfaces are constituted by the two annular portions of the frontal face left unrecessed within and outside of the said annular recess or groove.

The outer, peripheral sealing zone is preferably constituted by an annular lip which protrudes forwardly and outwardly, relative to the annular groove, while the inner sealing face is preferably constituted by an annular lip which protrudes forwardly and obliquely inwardly, both lips being integral parts of the flange. In their undeformed state, these lips can protrude up to 30 mm toward the outside or the inside, respectively.

In the vicinity of the outer and/or the inner annular sealing face, the flange can be provided with a circumferential ring channel which can be connected to a source for a pressure medium; a particularly good sealing effect is afforded by this embodiment. The flange can also comprise a partial stiffening inlay, in particular in the range of the rearward frontal flange face.

The flange according to the invention can be used advantageously in all those cases where it is important that an annular space be sealed off in a simple and reliable manner and that, at the same time, liquid media be introduced into that space as free from turbulence as possible.

A preferred field of its application is in the already described casting molds for producing, about pipes, envelopes from liquid masses of casting substance, in particular from foamable synthetic resin masses.

Therefore the invention also concerns as subject matter an apparatus of the initially described type, for producing enveloping casts about elongated bodies, in which at least that terminal closure through which the casting mass is to be introduced, is a flange embodying one or several of the afore-described advantageous features.

In a preferred embodiment of the apparatus according to this aspect of the invention, one of the two flanges, and preferably the flange comprising the duct system for introducing the liquid casting mass, is mounted displaceably in the space between the elongated body, in particular a pipe to be enveloped, and the outer tube, and is connected at its rearward frontal face to a shifting force-initiating device, by means of which a controllable force can be applied on the flange in both directions of displacement (means for axially shifting the flange).

This shifting force-initiating device can be connected to a programmable motor-operated drive means, in particular a hydraulic or pneumatic one or the like. The telescoping speed at which the device is lengthened by this drive is preferably so controlled, dependent on the amount of casting mass introduced with time, that the pressure in the annular chamber surrounding the body does not exceed a determined value.

The speed of this drive means in lengthening the annular chamber, and the amount of casting mass introduced into the latter, are so controlled that, in each time interval, the increase in volume with time of the annular chamber surrounding the body caused by its lengthening due to shifting the movable flange is at least approximately equal to the volume of the fed-in mass of casting resin.

The shifting force-initiating device can be devised additionally as a guiding and centering means and can be mounted on uniformly spaced rollers, balls or the like for displacement on the elongated body.

Furthermore, the mixing head of a dosing device for casting masses can be detachably fastened to the rearward portion of the flange or the shifting force-initiating device.

The arrangement of the duct system in the flange according to the invention has the added advantage that in the annular channel there occurs an additional mixing effect, which is very desirable in the case of the casting mass being a multi-component system.

BRIEF DESCRIPTION OF THE DRAWINGS

Further objects and details of the invention will become apparent from the following description thereof in connection with the accompanying drawings which show the application of different embodiments of the flange according to the invention in an apparatus for enveloping pipes; of these embodiments and apparatus comprising them.

DETAILED DESCRIPTION OF THE ILLUSTRATED EMBODIMENTS

Figure 1:
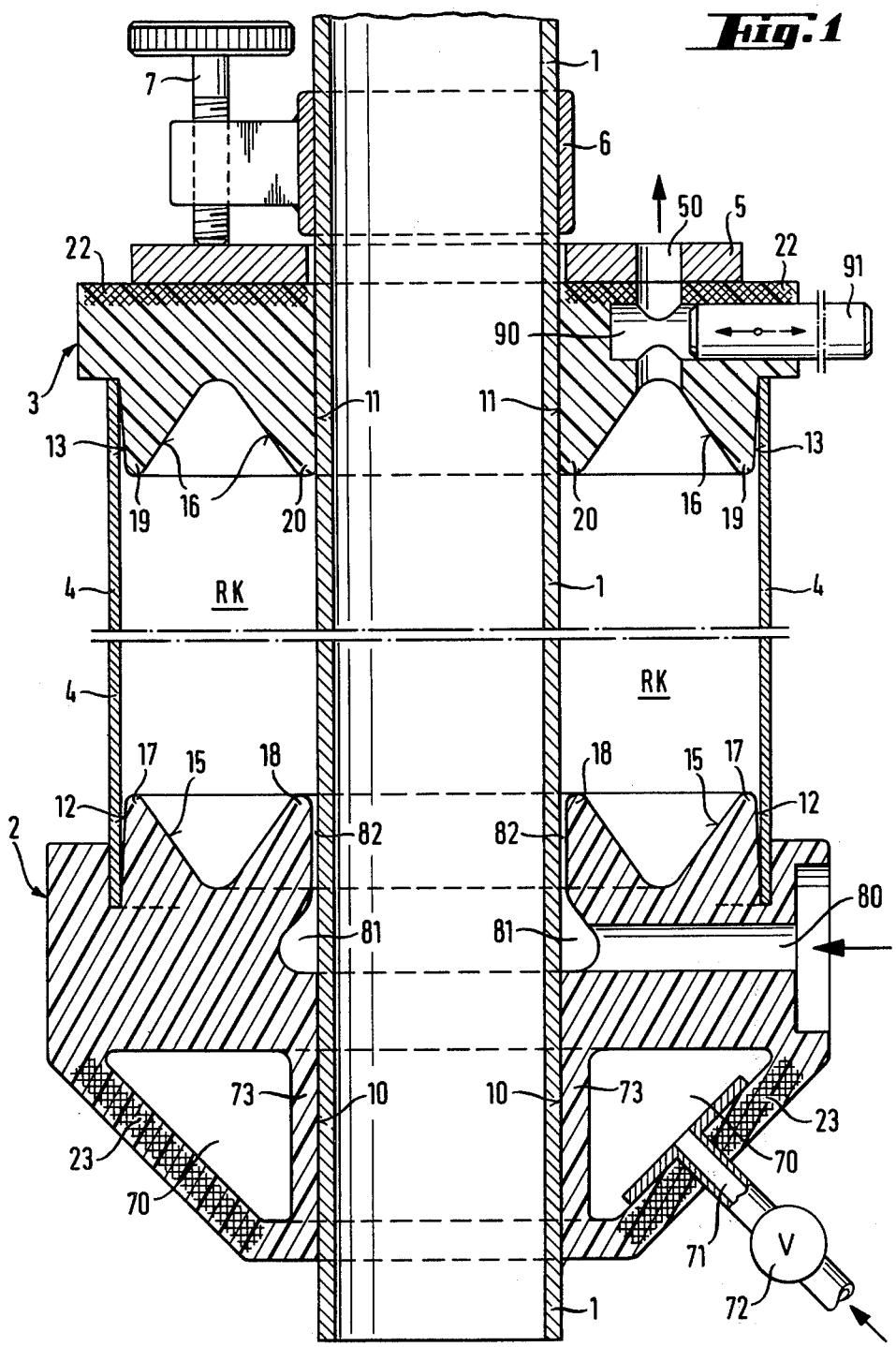
FIGS. 1 and 2 are axial sectional views and FIG. 3 is a cross sectional view taken in a plane indicated by III—III in FIG. 2. Parts which correspond to one another in the figures are designated by like numerals.

As shown in FIG. 1, a pipe designated by 1 bears two flanges designated by 2 and 3 and spaced from one another in axial direction, as well as an outer tube 4. The arrangement as shown is so assembled that the lower flange 2 is first pushed into place on the inner pipe 1, the outer tube 4 is then fastened on this flange, and the upper flange 3 is then pushed from the upper end of the assembly on to and between the pipe and tube. After being moved into position, the upper flange 3 is secured therein by means of a prop ring 5 and a clamping ring 6 with binding screw 7 against axial displacement. The lower flange 2 could be secured in position in the same manner. In practice, however, there is used to this end a pneumatic system to be described in detail further below.

The lower flange 2 is provided with a system of ducts 80, 81, 82 for introducing a liquid casting mass, and the upper flange 3 comprises a venting duct 90. The prop ring 5 of the upper securing means 5,6,7 against axial displacement is provided with a hole 50 for keeping the duct 90 open. The duct 90 can be closed by means of a slide valve 91.

The flanges 2 and 3 are seated tightly with their internal peripheral or sealing faces 10 or 11, respectively, on the inner pipe 1. Likewise, the flanges 2 and 3 seated with their outer circumferential faces 12 and 13, which are illustrated as being slightly conically tapered, tightly on the outer tube 4. Thanks to the rubber-like elasticity of the material from which the flanges are made, special sealing elements such as O-rings can be dispensed with. Above its sealing face 10, the flange 2 is of increased internal width, thereby forming an annular gap, between the flange and the pipe 1, which is designated by 82, being a part of the duct system. The entire duct system of the flange 2 comprises a radially extending bore 80 which opens into an annular channel 81 which merges with aerodynamic contour with the flow gap 82.

The frontal faces, being opposite each other, of the flanges 2 and 3 have each a groove 15 and 16, respectively, which is of more or less V- or U-shaped cross section. Each groove extends close to the internal and to the external edge of the respective frontal flange face, so that the annular rim portions of flange 2, of which the outer one is designated by 17 and the inner one, situated near the pipe 1, by 18, as well as the rim portions of flange 3, of which the outer one is designated by 19 and the inner one by 20, are given an additional, shape-dependent elasticity component. Whenever the internal pressure increases, the rim portions 17, 19 and 20 will therefore effect a corresponding increase of the contact pressure prevailing at the corresponding sealing faces 12, 13 and 11, respectively. The annular rim portion 18, on the other hand, causes the flow gap 82 to be closed automatically by the prevailing internal pressure in the annular, preferably cylindrical, enveloping mass-receiving chamber RK, whenever the latter, or the difference between the latter pressure and a pressure applied from the outside to the duct 80, exceed a determined value.

The flange 2 shown in FIG. 1 is provided, in the region of its sealing face 10, with a ring channel 70 which is connected via a tubulure 71 and a valve 72 to a pressure source (not shown) for instance of compressed air. When opening the valve 72, the ring channel 70 is brought under pressure, and thereby the channel wall 73 and together therewith the corresponding zone of the sealing face 10 are pressed more firmly against the pipe 4. This not only increases the sealing effect but also, above all, achieves a reliable securing of the flange against undesirable axial displacement. This simple and reliable method of locking the flange in its axial position could also be applied in the case of flange 3, instead of using the arrangement comprising rings 5 and 6 and the setscrew 7.

The flanges 2 and 3 are preferably made, by casting, from a plasticizer-containing synthetic resin, from silicone caoutchouc or the like flexible material. Certain portions of the flange can be reinforced for instance by a harder cast layer, by insertion of a plate or by incorporated fibers or tissue. Thus, in flange 3, a reinforcement 22 of the rearward or external frontal face has been indicated. This would render the reinforcing ring 5 superfluous. The reinforcing layer 22 does not extend radially inwardly up to the central flange opening. This permits the entire contact or sealing face 11 to remain soft, thus retaining fully the advantageous properties of the flange of being easily pushed on to, and pulled off from the pipe 1. At the same time the centering of the pipe is improved. The lower flange 2 possesses a similar reinforcement 23 in the wall surrounding the ring channel 70, thus permitting the outer wall of this channel to be made relatively thin.

The enveloping of the pipe 1 by using the arrangement shown in FIG. 1 is carried out as follows:

From a storage container or a mixer (not shown), a mass of flowable foam-forming substance is introduced in still unfoamed condition via the duct system 80,81,82 of the lower flange 2 into the mold chamber RK. The mass passes into this chamber through the annular gap 82, and rises in the latter while air escapes therefrom, with slide valve 91 being open, via the duct 90 of the upper flange 3.

When a predetermined amount of the mass has been filled into the chamber RK, feeding of the mass is interrupted. The mass begins to foam and to expand. When foamy mass begins to emerge through the duct 90 of the upper flange 3, the slide valve 91 is closed. Thereby the pressure rises in the interior space enclosed between the pipe 1, the tube 4 and the two flanges 2 and 3. When using foams produced by physical expansion, the pressure in the chamber RK attains about 2 to 5 bar, in the case of chemically produced foams only a fraction of this pressure. Due to its shape and elasticity the portion 18 of the lower flange will be pressed during this increase in internal pressure on to the pipe 1, thereby closing the gap 82. At the same time, with increasing foam pressure, the outer rim portion 17 of the lower flange 2 is pressed more firmly on to the outer tube 4, and the rim portions 19 and 20 are more strongly pressed, respectively, on to the tube 4 and the pipe 1. Owing to its rubber-like elasticity and specific configuration, the lower flange thus automatically fulfills the function of a check valve, while the locking in position of the two flanges 2 and 3 on the pipe 1 and their sealing effect are increased proportionately with the rise of internal pressure in the mold chamber RK.

After the resin foam has been solidified sufficiently, (which is brought about by heat-hardening or by solidification due to cooling, depending on the product employed), the two flanges 3 and 2 can be drawn off the pipe 1 after removal of the affixing arrangement of parts 5,6 and 7, and after decompressing the ring channel 70. The outer tube 4 usually remains in place on the enveloping foam mass as an outer protective shell.

As shown by the above explanations, the demands which are made on the flange 2 constituting the introduction device of the casting mold are considerably higher than those made on the overflow and air-release equipment of the flange 3. This is apparent, above all, from the layout of the duct systems in both flanges. In the overflow and air-escape flange 3 a simply axial duct 90 is sufficient. In the filler flange 2, the layout of the duct system is of decisive importance.

The filler flange 2 of the arrangement shown in FIG. 1 is distinguished, among other features, by ensuring, due to the special configuration of its annular flow gap 82, a filling action which is highly uniform and takes place by essentially laminar flow; and by the annular gap 82 closing automatically when the internal pressure in the casting chamber RK reaches a determined value.

Figure 2:
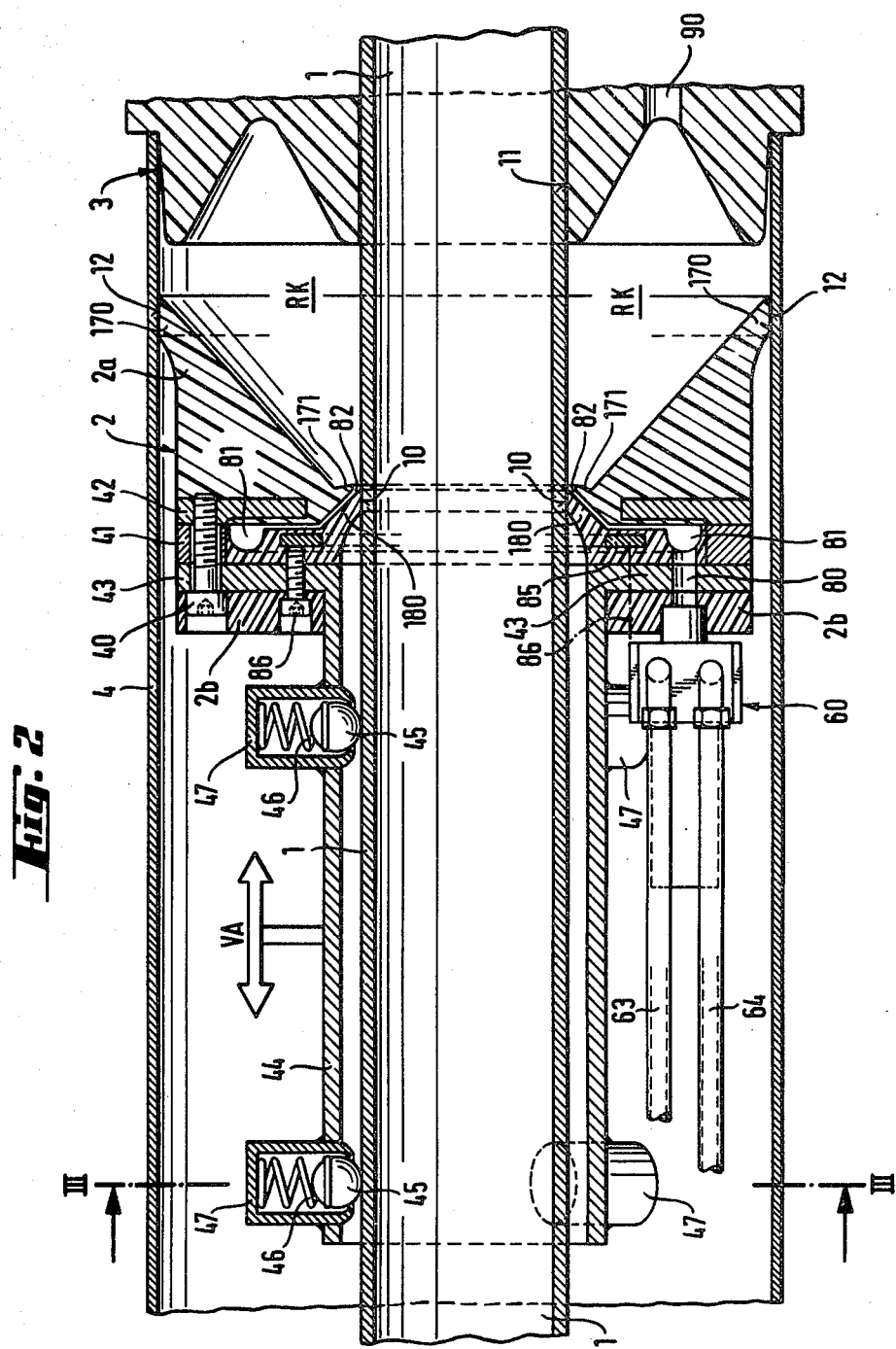
Figure 3:
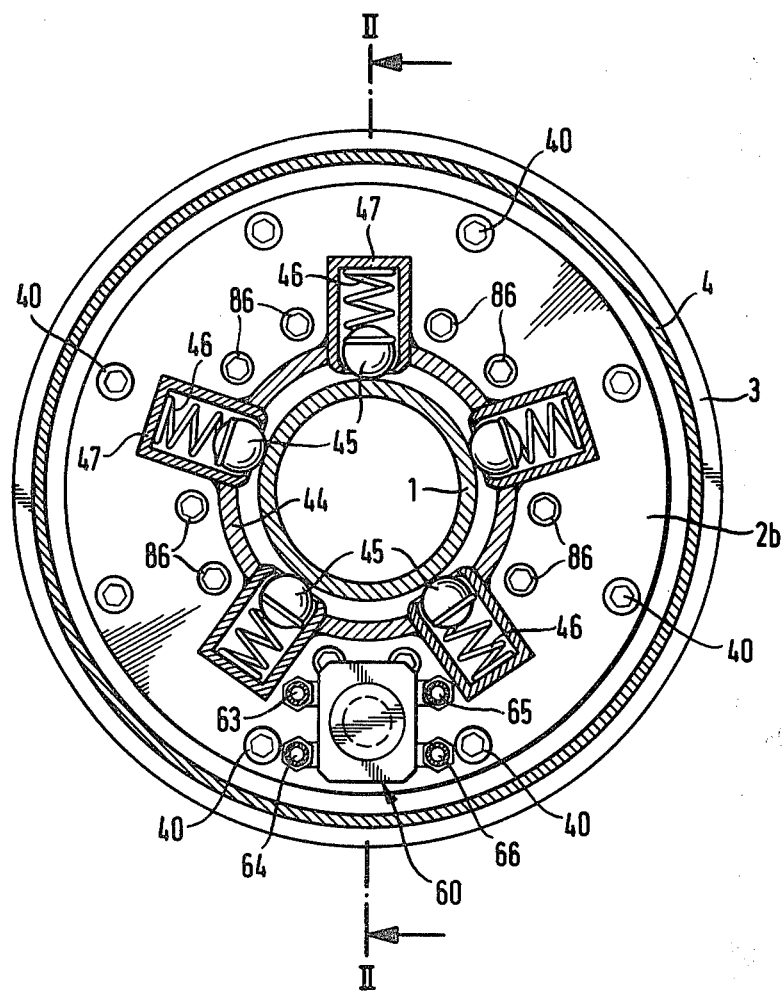

In the FIGS. 2 and 3, there is shown an arrangement having an improved filler flange 2. As air-escape flange there may be used the same type as in FIG. 1. It has, therefore, only been indicated by showing its forward contours, i.e. those facing toward the interior of the casting chamber RK.

In the FIGS. 2 and 3 the pipe to be enveloped has been designated by reference numeral 1 and the outer tube by 4.

The flange 2 in this embodiment consists of two parts. The two parts 2a and 2b are detachably assembled under tension by means of bolt screws 40 with insertion of a washer 41 of hard material, in particular of metal. In each of the two flange parts 2a and 2b there is embedded a relatively flat metal ring 42 or 43, respectively. The bolts 40 extend through holes in the rearward flange part 2b and in the metal ring 43 embedded therein, as well as through bores in the washer 41 and are screwed with their forward free ends into threaded holes in the metal ring 42 which is embedded in the forward, upper flange part 2a.

As illustrated, the metal ring 43 constitutes a flange-like integral part of a tubulure 44 which extends out of the flange part 2b rearward or downward coaxially spacedly about the pipe 1. This tubulure is designed as a centering means for the flange 2, for which purpose it is provided with freely rotating balls 45 which are seated in outwardly projecting cup-shaped cages 47 which are open inwardly, i.e. toward the pipe 1. The balls 45 are urged by compression springs 46 radially inwardly against the pipe 1. The balls are arranged in pairs in axially parallel tracks and the pairs of balls, of which five balls are illustrated in FIG. 3, are evenly distributed about the circumference of the pipe 1.

The sealing faces 10 and 12 of the flange are constituted by integral, steeply forwardly projecting annular lips 180 and 170, respectively. The annular lip 170 which bears the outer sealing face 12 is a portion of the forward flange half 2a, while the lip 180 which bears the sealing face 10 is a portion of the rearward flange half 2b.

The annular lips 170 and 180 project further outwardly or inwardly, respectively, in their undeformed state (not illustrated) by, for instance, up to 30 mm, depending on the size of the flange. This permits achievement of an unobjectionable sealing effect between the flange and the pipe or tube, even when the diameter tolerances of pipe 1 and tube 4 are large. This is of particular importance when, for instance, the inner pipe is or will be welded together from several pieces of pipe, so that the tube can be easily pushed over the weld beads.

The ring channel 81 and the flow gap 82 are produced by recessing from the plane of separation between the two flange parts 2a and 2b. This has the advantage, among others, that the duct system can be cleaned easily after each use of the flange. The forward flange part can be provided at the mouth of the flow gap with a thin ring lip 171, whereby an additional check-valve effect is attained.

The boundary wall directly adjacent the ring channel 81 is reinforced by a backing in the form of a stiff inlay, in particular a flat metal ring 85. The forward free ends of the squeezing screws 86 act on this ring 85; they are screwed through threaded bores in the steel ring 43 and their heads are accessible from the rear. The squeezing or pressure screws 86, of which ten have been used and are illustrated in FIG. 3, are evenly distributed about the circumference of the metal ring 85. By a corresponding adjustment (determined empirically) of these screws 86, a uniform flow of enveloping casting substance can be assured over the entire circumference of the flow gap.

In the FIGS. 2 and 3, the reference numeral 60 designates a high pressure-mixing and dosing head for a liquid multi-component casting resin system. This head 60 is affixed directly to the flange 2 or to its rearward part 2b, its discharge nozzle being directly connected with the feeding duct 80. The conduits for the feeding and for the emptying components are designated by 63 and 65, or 64 and 66, respectively, and are connected to dosing pumps (not shown).

The guiding and centering device comprising the tubulure 44 and the bearing balls 45 can also be used as shifting force-initiating device. By means of this device, a controllable force can be exerted on the flange 2 in either of the two directions of axial displacement. This device, and together therewith the flange to which it is coupled, can be connected with a programmable motoric, in particular a hydraulic, pneumatic or the like driving means. This driving means is of conventional construction and therefore only indicated by a double arrow VA. Preferably, the velocity of shifting the centering device outwardly, lengthening the chamber RK, is so controlled as a function of the amount of casting mass introduced per unit of time that the pressure in the annular mold chamber RK does not exceed a set limit value. On the other hand, the control can be laid out in such a manner that the drive means VA is so controlled with respect to its velocity of telescoping outwardly and the rate of introduction of the mass of casting resin that, in each time interval, the increase of volume of the annular chamber RK with time effected by the outward telscoping of the centering device is at least approximately equal to the volume of the introduced amount of casting resin. Such programmable control systems are well known, so that their representation and detailed description can be dispensed with.

The operation of the arrangement illustrated in FIGS. 2 and 3 can be carried out in the same manner as that shown in FIG. 1, wherein both flanges remain throughout the entire casting and possibly during a subsequent foaming phase in their respective positions in which they were locked at the beginning of the casting operation. This "stationary" method is unsuited for the processing of rapidly reacting or quickly hardening casting masses, especially in the case of longer casting molds as the casting mass will gel or solidify already on its way from the filler flange 2 to the air-escape flange 3 and thus renders it impossible to achieve a complete uniform filling.

The arrangement of FIGS. 2 and 3 is therefore usually operated with a "mobile" filler flange 2. At the beginning of the filling step the filler flange 2 and the mixing head 60 is in this case in the close vicinity of the air-escape flange 3 and is already coupled to the driving means AV. The pipe 1 and outer tube 4 are held in centered positions by means of known holding devices which are not illustrated.

The dosing pumps (not shown) feeding the mixture head 60 as well as the latter are now put in operation, and the casting resin mixture is fed via the duct system 80-81-82 into the space RK which is enclosed by the two flanges 2 and 3 and by the pipe 1 and outer tube 4. As soon as the level of the casting mass in this space reaches the air-escape flange 3 and begins to flow out of the air escape duct 90, the latter duct is closed and there begins the phase of the withdrawal or free or braked pushing back of the filler flange 2.

While the outer tube 4 has its one open end closed off by the air-escape flange 3 in which it is supported in the same manner as in the embodiment of FIG. 1, the mobile flange 2 is not supporting the other free end of the outer tube 4 in this same manner. While the flange 2 does so in the embodiment of FIG. 1, in the embodiment of FIGS. 2 and 3, this flange is housed axially displaceably in the interior of the outer tube 4. amd an outer peripheral portion, e.g. the annular lip 170, of the flange 2 makes sealing contact at all times throughout the entire casting operation with the inner wall surface of the outer tube 4.

Whether the displacement of the flange 2 away from the other, stationary flange 3 is left to the free play of forces or is braked by applying the drive means AV or is actively withdrawn by means of the latter depends on the chosen mode of operation or on the type of casting substance and the desired result. The arrangement itself offers the advantage of leaving the user free to choose any of these possibilities.

If, for instance, an epoxide resin foam system having a physical expanding means is chosen as the casting mass, which system is known to produce during foaming pressures of about 2 to 6 bars, then, as a rule, a braking action is applied. The braking force or, respectively, the speed of the driving means AV can be so controlled, among other factors as a function of the amount of mass introduced per unit of time and of the course of the foaming phase, that the pressure in the casting mold is at least approximately constant at a determined value. Thereby it is possible to obtain any desired foam density within a reasonable range.

At the end of the displacing phase the filler flange 2 is again locked in position on pipe 1. In the case that, for instance, a foaming system is used and operated at higher foam pressure, the annular gap 82 is automatically closed by the internal pressure in the mold chamber RK, after the introduction of casting mass has been interrupted.

After the solidification or full hardening of the cast mass the flanges 2 and 3 are withdrawn from the pipe 1 and cleaned. They can be used for practically a random number of operations.

It is also possible to process longer stretches of piping which are composed of a random number of pipe lengths. In this case the first length of pipe is treated as described hereinbefore and is enveloped not fully up to its one end. The rearward part 2b of the flange 2 is then drawn off, the mixing head 60 is detached, the surface of the flange parts 2 at the same plane of separation are cleaned, a further length of pipe is welded to the envelope-free end of the otherwise enveloped pipe length, the flange part 2b is pushed on to the free end of the new length of pipe and is screwed together with the forward flange 2a, the flange 2 is then coupled with the driving means AV and finally a length of tubing is welded to the corresponding end of the outer tube 4. The arrangement is then ready for producing an envelope of cast substance about the new length of pipe.

Thus, a quasi-continuous enveloping of longer pipelines is made possible. Weld seams offer no problem as the flange can easily slide over them due to its properties of rubber-like elasticity, without thereby interrupting its sealing effect.

During the successive enveloping of longer lines of piping an air-escape flange 3 is used during the step of enveloping the first length of pipe. Afterwards, there is no space between the filler flange 2 and the previously cast envelope length which need be de-aerated. In particular in this case, the air-escape flange of rubber-like elasticity can be replaced by any other suitable type of closure having a closable air-escape vent. For instance, the pipe and tube can be closed off initially by a welded-on frontal plate having a closable opening. This variation in the method of operation will afford a very sturdy beginning of the enveloped pipe and is thus particularly suitable when the pipe is to be installed immediately after having the envelope applied thereto.

The flanges 2 and 3 are cast as a whole from a uniform material with the metal parts and other reinforcing inlays embedded therein. The hardness of the cast flange material lies between Shore A (DIN 53505) 25 and 30. In special cases, substantially softer or harder materials can be suitable for casting the flanges (down to Shore A 20 or up to Shore A 80).

It is particularly suitable to choose such known materials of rubber-like elasticity as, for instance, silicone caoutchouc which have the property of being easily separable from a synthetic foam material which was brought in liquid form in contact with them and was thus solidified. This has the considerable advantage that no use of a separating means is required when using flanges as a part of an envelope-casting apparatus for pipes or the like, thus saving a time-consuming operational step and moreover improving hygienic conditions during the work.

As materials for making the flange there are particularly suitable the following:
silicone caoutchouc of the Wacker GmbH, Munich, Fed. Rep. of Germany, of the type designations RTV-ME 622 and RTV-ME 628,
silicone caoutchouc of Coltene AG, Altstätten, Switzerland having the product designation Coltoflex, and
the tool resin materials of CIBA-GEIGY AG, Basel, Switzerland known under the tradename Ureol, of the types Ureol 6402-6402B (Shore hardness 75) and Ureol 6409A-6409B (Shore hardness 30).

The invention is not limited to the illustrated and described embodiments. It is, however, essential that the fittings consist of a material of rubber-like elasticity and that the duct system has a lengthy internal distributory channel 81 which merges on its exit side with a relatively narrow, preferably self-closing gap 82. The distributory channel and the gap need not be necessarily of annular shape and closed upon themselves. Neither need the fitting have a bore for receiving therein the inner pipe 1 to be enveloped. Of course, it need not be of circular cross section, but can be of any other, e.g. of a rectangular cross section. It can also be relatively small, in which case the distributory channel and the flow gap can extend over the larger portion of its length. The fitting can be adapted to fit on to any random casting mold orifice and can be used as a stationary or as a mobile closure means, while its duct system will always guarantee a substantially laminar flow of the casting mass into the mold.

What is claimed is:

1. An annular flange of elastomeric material for mounting between two concentric tubular members to define a mold chamber therebetween, said flange having an annular recess near the outer perimeter thereof for receiving an end of the outer of said tubular members, said flange having a through aperture between radially separated inner and outer surfaces and having a radially relieved surface such as to define with an outer surface of the inner of said tubular members a flow gap therebetween, said gap communicating with said through aperture.

2. The flange of claim 1, which consists of two pieces joinable together along a common plane of separation, and at least one of the flow gap and the annular distributory channel is constituted by a correspondingly shaped recess in the faces of the two pieces along the plane of separation.

3. The flange of claim 1, wherein the flange material is of a type which is easily separable from foamed plastics.

4. The flange of claim 3, wherein said flange material has a surface which is resistent to adhesives.

5. The flange of claim 3, wherein said flange material is resistent to silicone rubber.

6. The flange of claim 1, having a central passage which permits a pipe to be lodged therein with a firm seat, said flange having an inner sealing face for sealing contact with the outside surface of said pipe.

7. The flange of claim 6, wherein said flow gap is constituted by a widening of said central passage in the range between said inner sealing face and said forward frontal face of said flange.

8. The flange of claim 1 or 6, which is of such configuration that the flow gap is closed due to the shape of at least one of the flange wall zones which surround it as well as due to the elasticity of the flange material, and that it will be opened only when, and as long as, the pressure of a pressure medium which is introduced via the annular distributory channel exceeds the counter-pressure of a medium acting upon the above-mentioned forward frontal flange surface.

9. The flange of claim 1 or 7, wherein the configuration of the flange is such that the flow gap is closed because of the shape of at least one of the flange wall zones delimiting the same, as well as due to the elasticity of the flange material, when, and as long as, the pressure of a pressure medium acting on the aforesaid forward frontal flange face exceeds by a determined value the pressure of a pressure medium which is introduced via the above-mentioned annular distributory channel.

10. The flange of claim 1 or 6, wherein a region of said flange has sealing surfaces of such shape that due to shape and the elasticity of the flange material, the sealing pressure on the sealing surfaces increases proportionally to a pressure which is exerted by a pressure medium on the forward frontal flange face.

11. The flange of claim 1 or 6, wherein one face of the flange is provided with a coaxial recess of a substantially U- or V-shaped cross section extending to the vicinity of two edges, an inner and an outer one, of the said flange face, while sealing surfaces are constituted by two annular portions of the frontal face left unrecessed within the area circumscribed by said annular recess on the one hand, and outside of said recess, on the other hand.

12. The flange of claim 1 or 6, wherein an outer, peripheral sealing surface is constituted by an annular lip which protrudes forwardly and outwardly, relative to said annular recess, while the inner sealing surface is constituted by an annular lip which protrudes forwardly and obliquely inwardly, both lips being integral parts of said flange.

13. The flange of claim 1 or 6, wherein, in the vicinity sealing surface, the flange is provided with a ring channel which can be connected to a source for a pressure medium.

14. In an apparatus for casting material about a cylindrical body, wherein a body to be enveloped is positioned coaxially in a tube which, together with two terminal closures, forms an annular chamber about the body, into which a liquified casting mass is introduced via one of the two terminal closures, the improvement of at least that terminal closure through which the casting mass is to be introduced, being a flange as defined in claim 1 or 6.

* * * * *